United States Patent [19]

Schoenkopf et al.

[11] 4,355,733

[45] Oct. 26, 1982

[54] PACKAGE DISPENSER MECHANISM

[76] Inventors: Richard W. Schoenkopf, 238 E. State St., Doylestown, Pa. 18901; Donald H. Ross, 910 Township Line Rd., Chalfont, Pa. 18914

[21] Appl. No.: 189,006

[22] Filed: Sep. 22, 1980

[51] Int. Cl.[3] .................... G07F 11/48; B65G 59/00

[52] U.S. Cl. .................... 221/123; 221/224; 74/471 R

[58] Field of Search .................... 221/6, 7, 16, 17, 123, 221/191, 195, 224, 238, 268; 194/2, 10; 74/471 R

[56] References Cited

U.S. PATENT DOCUMENTS

| | | | |
|---|---|---|---|
| 2,457,778 | 12/1948 | Jorgensen | 312/63 |
| 2,799,430 | 7/1957 | Kintzel | 221/123 X |
| 4,278,182 | 7/1981 | Ahlström | 221/123 X |
| 4,301,909 | 12/1981 | Snavely | 194/2 |

*Primary Examiner*—Allen N. Knowles

*Attorney, Agent, or Firm*—Robert J. Mooney

[57] ABSTRACT

A computer-controlled system is disclosed for dispensing selected packages from a vending machine. The system includes an ejector mechanism adapted to travel rectilinearly intermediate a pair of oppositely-mounted storage banks, each bank consisting of a plurality of vertically-oriented adjacent compartments in which distinct packages are stacked. The ejector mechanism includes a carriage mounted on a helical screw rotatably driven by a travel motor. An ejector lever pivotally connected to the carriage is mounted upon an actuator bar rotatably driven by a pivot motor for independently actuating one of a pair of overlapping ejector arms according to the directional rotation of the pivot motor. Each ejection arm is pivotally connected to the carriage and configured to discharge a single package from beneath a stack when actuated. A microprocessor controls the rotational drive of the motors and is provided feedback signals indicative of carriage location package availability by sensors attached to the carriage.

11 Claims, 5 Drawing Figures

FIG. 1
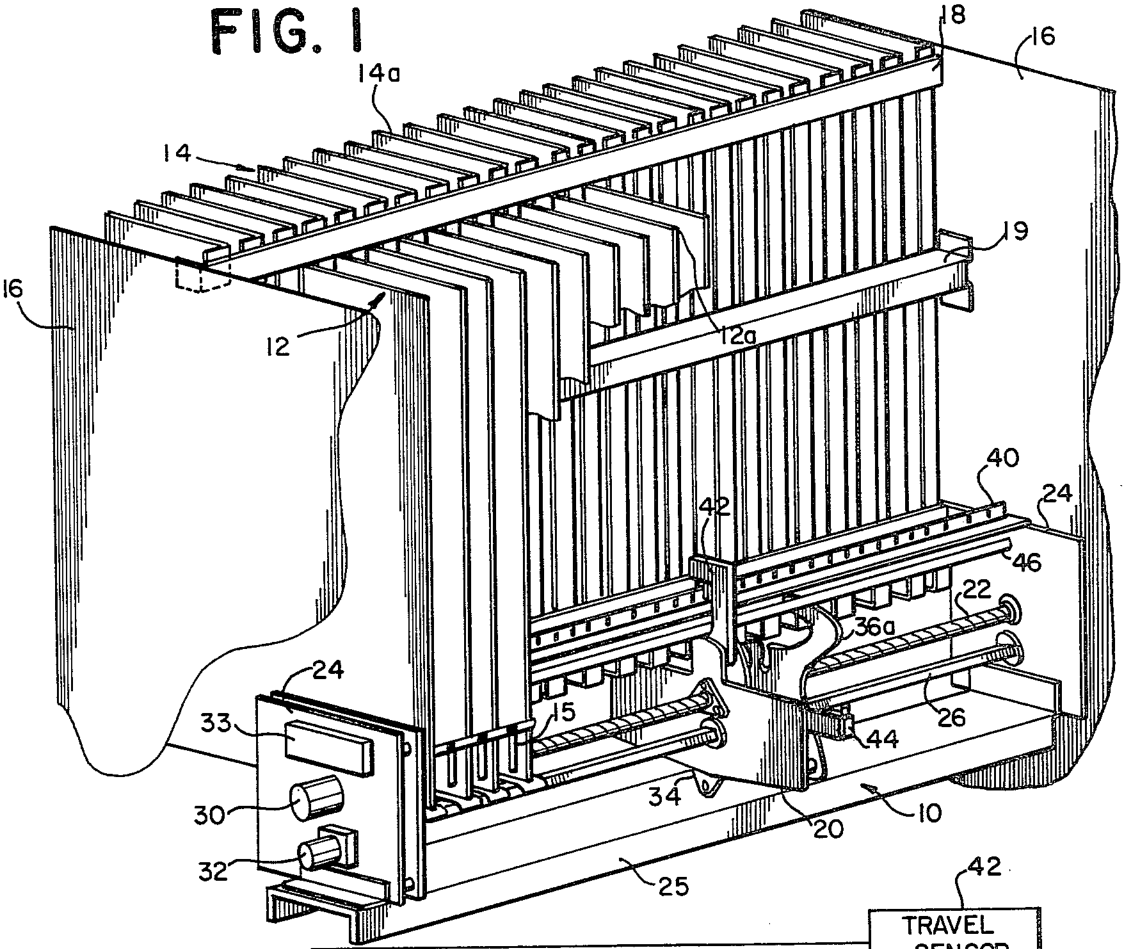
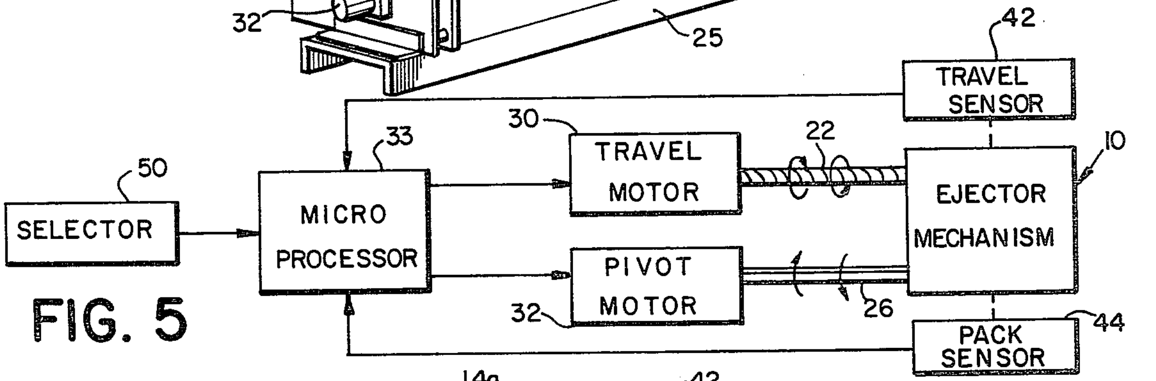
FIG. 5
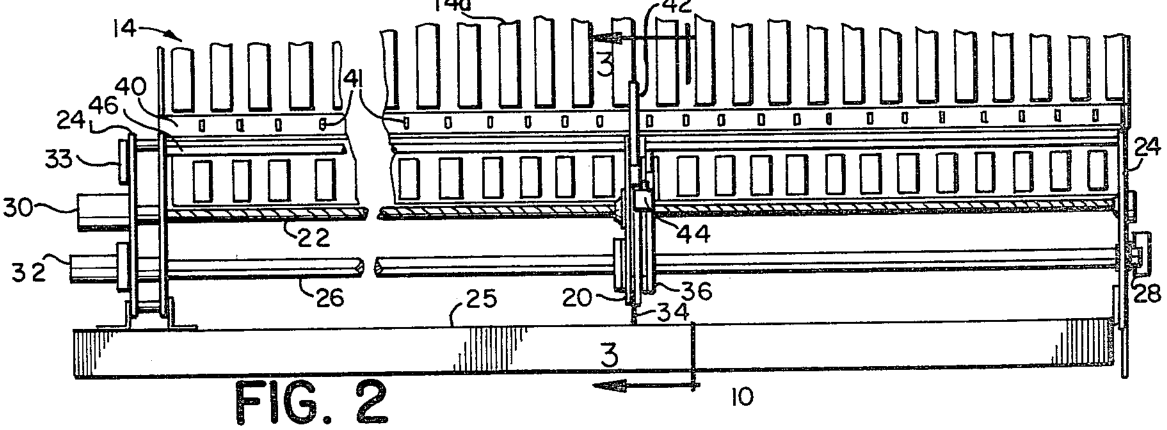
FIG. 2

PACKAGE DISPENSER MECHANISM

BACKGROUND OF THE INVENTION

The present invention relates to package dispensing, and more particularly to an improved dispensing system for a vending machine wherein a dual-acting ejector mechanism is adapted to travel within oppositely mounted storage banks to increase selection capacity.

Coin-operated vending machines utilize a variety of different systems for dispensing the articles stored and selected. Such dispensing systems are basically mechanical and electrical in operation, and generally require duplicate actuating parts for each of the various selection stations at which different articles are stored. As these vending machines offer an increasingly larger selection of items, the number of machine parts become large and the resulting costs of such machines becomes prohibitive.

While current vending machines have progressed technically with respect to the mechanisms provided therein for dispensing the articles selected, none of such vending machines have been satisfactory in providing an increased selection capability without higher machine costs. Furthermore, currently available dispenser mechanisms are complicated in structure and operation, being composed of a multitude of moving parts that increase maintenance problems and the risks of malfunction.

SUMMARY OF THE INVENTION

Accordingly, it is a general purpose and object of the present invention to provide an improved dispensing system for a vending machine whereby a larger selection of vendable packages is provided without increased machine costs.

Another object of the present invention is to provide an efficient system for dispensing the articles stored in a vending machine that is dynamic and computer-controlled to selectively discharge the packages using a limited number of moving parts.

Still another object of the present invention is to provide a high-capacity package dispensing system for use in vending machines that is reliable in operation and economical to manufacture.

Briefly, these and other objects of the present invention are accomplished by a computer-controlled system for dispensing selected packages from a vending machine. The system includes an ejector mechanism mounted to travel rectilinearly within a pair of oppositely situated storage banks, each bank consisting of a plurality of vertically oriented adjacent compartments in which distinct packages are stored. The ejector mechanism includes a carriage mounted on a helical screw driven by a travel motor. An ejector lever pivotally connected to the carriage is mounted upon an actuator bar driven by a pivot motor for rotatably actuating either one of a pair of independent ejector arms depending on the direction of rotation of the pivot motor. Each ejector arm is pivotally connected to the carriage and configured to engage the lever so that a single package is discharged from a compartment when actuated. A microprocessor controls the rotational drive of the motors and is provided feedback signals indicative of carriage location and package availability thereat by a travel sensor and pack sensor, respectively.

For a better understanding of these and other aspects of the present invention, reference may be made to the following detailed description taken in conjunction with the accompanying drawings in which like reference numerals designate like parts throughout the figures thereof.

BRIEF DESCRIPTION OF THE DRAWINGS

FIG. 1 is a perspective view of a dispensing system according to the present invention;

FIG. 2 is a longitudinal view in elevation of the dispensing system of the present invention;

FIG. 5 is a control block diagram of the dispensing system according to the present invention.

DESCRIPTION OF THE PREFERRED EMBODIMENT

Figure 3:
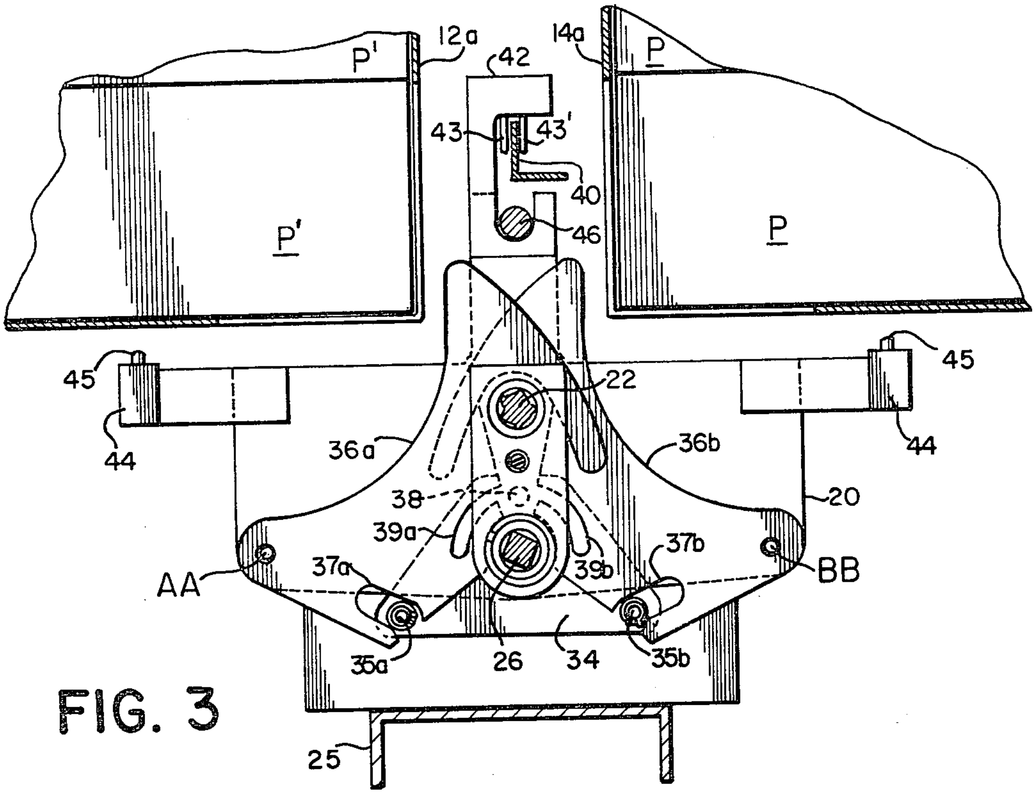
FIG. 3 is a sectional view of the dispensing system taken along the line 3—3 of FIG. 2.

Referring now to FIGS. 1 and 2, a package dispensing system is shown wherein an ejector mechanism 10 is mounted for rectilinear travel beneath and between a front and back storage bank 12 and 14, respectively. Storage banks 12 and 14 are oppositely situated between a pair of side panels 16 and are supported therebetween by upper and lower support bars, 18 and 19, respectively. Each storage bank 12 and 14 consists of an equal number of adjacent compartments **12*a* and 14*a*, typically as many as thirty in each bank, that are vertically oriented to store stacks of packages therein. Compartments 12*a* and 14*a* are preferably adjustable in depth to accommodate packages of various lengths, and are configured at the bottoms thereof to hold the packages in place until ejection. A spring clip 15 attached at the bottom of each compartment 12*a* and 14*a* retains the bottom package prior to its ejection into collection chutes (not shown) located below each storage bank 12 and 14**.

The ejector mechanism 10 includes an ejector carriage 20 through which a helical screw 22 is rotatably coupled. Helical screw 22 is an elongated member extending the length of storage banks 12 and 14 between and below the banks. Thehelical screw 22 is rotatably connected at its ends to side brackets 24 supported on either side of storage banks 12 and 14 upon a mounting frame 25 that spans the length of the banks. A travel motor 30 secured to side bracket 24 is coupled to one end of helical screw 22 for driving the screw in rotation in a clockwise or counterclockwise direction so that the ejector carriage 20 is moved rectilinearly back and forth as desired. Travel motor 30 is a low voltage electric motor controlled by a microprocessor 33 described in greater detail hereinafter, and may be gear-coupled to helical screw 22 to provide rotational drive thereto.

A square actuator bar 26 extending substantially parallel to and just below helical screw 22 is likewise rotatably coupled to ejector carriage 20. The ends of actuator bar 26 are journaled and rotatably connected to side brackets 24. A pivot motor 32, similar to the travel motor 30, is secured to side bracket 24 and coupled to one end of the actuator bar 26 for driving the bar in rotation in either a clockwise or counterclockwise direction as controlled by microprocessor 33. An angle limiter 28 is coupled to the opposite end of actuator bar 26 for sensing the angle of rotation thereof and for providing a feedback signal to the pivot motor 32 for limiting rotation to a predetermined angle, typically 60° in either direction. The angle limiter 28 may take any suitable form and may, for example, be an appropriately slotted cup coupled to the actuator bar 26 which cooperates with an infra red emitter and receiver to form a conventional beam breaking sensor.

Referring now to FIG. 3 in conjunction with FIGS. 1 and 2, an ejector lever 34 is pivotally connected to carriage 20 and mounted upon actuator bar 26 so that the lever travels rectilinearly along with the carriage and is rotated appropriately in either direction by the square bar. A pair of ejector arms 36*a* and 36*b* are pivotally connected to carriage 20 on opposite sides thereof about respective axes AA and BB, so that the arms normally overlap each other and each arm is similarly configured to interengage ejector lever 34 for independent cooperation therewith. A pair of actuating pins 35*a* and 35*b* are affixed to the lower portion of ejector lever 34 on opposite sides thereof and normally engage actuating slots 37*a* and 37*b*, respectively, formed in ejector arms 36*a* and 36*b*. A guide pin 38 affixed to the upper portion of ejector lever 34 is aligned with radial guide slots 39*a* and 39*b* formed in ejector arms 36*a* and 36*b*, respectively.

A sensor bar 40 having a plurality of slots 41 formed therein to correspond with distinct ones of the vertical compartments 12*a* and 14*a* is mounted to span the length of storage banks 12 and 14 above and substantially parallel to the helical screw 22 and actuator bar 26. A travel sensor 42 attached to the top of ejector carriage 20 includes an infrared emitter 43 and receiver 43' which are positioned on opposite sides of the slotted sensor bar 40 to form a conventional beam breaking sensor which provides a feedback signal to the microprocessor 33 indicative of the compartmental location of the carriage. Pack sensors 44 are mounted on either side of carriage 20 and are provided with adjacent upwardly directed infrared light emitters and receivers 45 which provide the microprocessor 33 with a feedback signal indicative of the availability of packages at a particular compartmental location in either the front or back storage bank, 12 and 14, respectively. One of the pack sensors 44 would project a beam of light up the particular vertical compartment 12*a* or 14*a* at which the carriage 20 stopped, and if a pack P or P' were available for dispensing, reflective light from the pack would be returned to the sensor thereby signaling the microprocessor 33 of the advisability of actuation of ejector mechanism 10. If the compartment 12*a* or 14*a* is empty, no light is reflected and the package sensor 44 would signal microprocessor 33 of the unadvisability of actuation of ejector mechanism 10 and an appropriate signal could be displayed to the user. An elongated rod 46 extending the length of the storage banks, 12 and 14, through which the ejector carriage 20 travels, is mounted to engage the upper portion of the carriage so that the ejector mechanism 10 is stabilized during the torquing of the ejection actuation.

Figure 4:
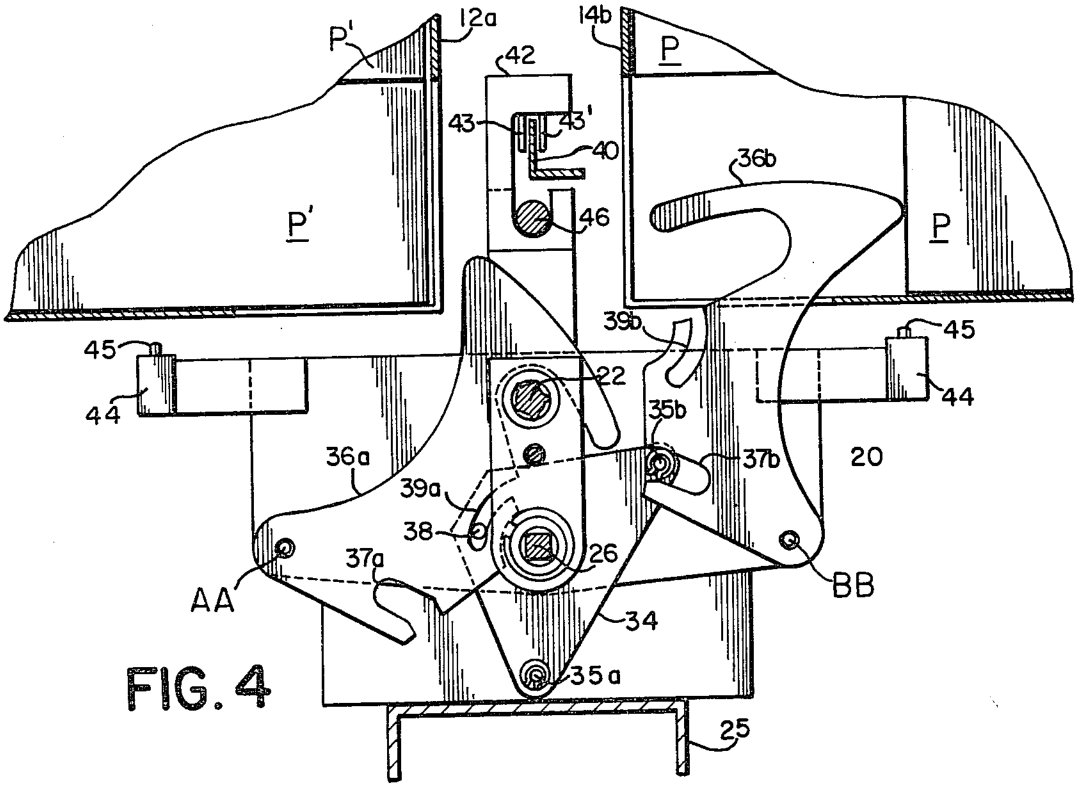
FIG. 4 is a sectional view of the dispensing system of FIG. 3 showing the relative movement of parts during operation.

Referring now to FIGS. 4 and 5 in conjunction with FIGS. 1-3, the operation of the dispensing system will now be described. A coin-activated selector 50 signals microprocessor 33 of the selection of a desired package P. Microprocessor 33 includes a memory in which is stored the last compartmental position of ejector mechanism 20 and the new compartmental location of the desired package P. Microprocessor 33 appropriately energizes travel motor 30 to drive helical screw 22 in either a clockwise or counterclockwise direction thereby moving the ejector mechanism 10 via carriage 20 to the compartmental location of the desired package P. Travel motor 30 ceases to drive helical screw 22 and the ejector mechanism 10 stops at the desired location upon the feedback signal provided to microprocessor 33 from travel sensor 42.

Having reached the desired compartmental location, pack sensor 44 determines the availability of package P in the vertical compartment 14*a* and signals microprocessor 33 appropriately. Microprocessor 33 energizes pivot motor 32 to drive actuator bar 26 in a counterclockwise direction (as viewed in FIG. 4) sensed and limited by angle sensor 28. Counterclockwise rotation of actuator bar 26 turns ejector lever 34 in the same direction thereby pivoting ejector arm 36*b* in a clockwise direction about axis BB through the cooperation of actuating pin 35*b* on the ejector lever and slot 37*b* in the ejector arm. In the course of its pivotal action, ejector arm 36*b* pushes package P out of compartment 14*a*, through retaining spring 15, and into a chute (not shown) for collection. Insured by engagement of guide pin 38 in guide slot 39*a*, the opposite ejector arm 36*a* is maintained in its normal position during pivotal actuation of ejector arm 36*b*. Accordingly, each ejector arm acts independently of the other. It should be noted that the upper portion of the ejector arms 36*a*, 36*b* is configured to push out or eject only the next available package while retaining the remaining packages in the stack thereby dispensing one package at a time.

Therefore, it is apparent that the disclosed invention provides an improved article dispensing system for particular use in vending machine applications whereby an increased selection capability is provided without incurring increased machine costs. In addition, the disclosed package dispensing system provides an efficient means of delivering selected articles that is dynamic and computer-controlled to selectively discharge the desired articles one at a time using a limited amount of moving parts. Furthermore, the present invention provides a high-capacity dispensing system that is reliable in operation and economical to manufacture.

Obviously, other embodiments and modifications of the present invention will readily come to those of ordinary skill in the art having the benefit of the teachings presented in the foregoing description and drawings. It is therefore to be understood that various changes in the details, materials, steps, and arrangements of parts, which have been described and illustrated to explain the nature of the invention, may be made by those skilled in the art within the principle and scope of the invention as expressed in the appended claims.

We claim:

1. An apparatus comprising:

a frame;

a carriage movably mounted on said frame;

a lever rotatably connected on said carriage; and two arms pivotally connected to said carriage and engaged by said lever in such manner that one of said arms independently pivots clockwise upon counterclockwise rotation of said lever and the other of said arms independently pivots counterclockwise upon clockwise rotation of said lever.

2. An apparatus according to claim 1 further comprising:

means for moving said carriage to a selectable position along said frame;

means for selectively rotating said lever in either a clockwise or counterclockwise direction.

3. An apparatus according to claim 2 wherein said means for moving said carriage comprises:

a first motor affixed to said frame;

an elongated screw driven by said first motor and threadably engaging said carriage; and sensor means coupled to said carriage to detect the position of said carriage along said frame.

4. An apparatus according to claim 3 wherein said means for rotating said lever comprises:

a second motor affixed to said frame; and an elongated bar driven by said second motor and engaging said lever for rotation thereof.

5. An apparatus according to claim 4 further comprising:

sensor means coupled to said bar for limiting the rotation of said bar to a predetermined degree in either direction of rotation.

6. An apparatus comprising:

a frame;

a carriage movably mounted on said frame;

a lever rotatably connected to said carriage;

two arms pivotally connected to said carriage and engaged by said lever in such manner that one of said arms independently pivots clockwise upon counterclockwise rotation of said lever and the other of said arms independently pivots counterclockwise upon clockwise rotation of said lever;

means for moving said carriage along said frame;

means for rotating said lever in either a clockwise or counterclockwise direction;

means coupled to said carriage for producing a signal indicative of the position of the carriage along the frame;

means coupled to said lever for producing a signal indicative of the direction and degree to which the lever has rotated; and control means responsive to both said signals for causing said carriage to assume a selectable position along said frame and for limiting the rotation of said lever to a predetermined degree in either direction of rotation.

7. An apparatus according to claim 6 further including:

means coupled to said carriage and to said control means for producing a signal indicative of the presence or absence of objects located in a predetermined direction away from said carriage.

8. An apparatus according to claim 6 wherein said means for moving said carriage includes a first motor which is affixed to said frame and drives an elongated screw threadably engaging said carriage, and wherein said means for rotating said lever includes a second motor which is affixed to said frame and drives an elongated bar engaging said lever.

9. An apparatus for dispensing packages comprising:

a pair of opposed storage banks;

a plurality of package storage compartments located at predetermined positions within each of said banks;

a frame mounted between said banks;

a carriage movably mounted on said frame;

a lever rotatably connected to said carriage;

two arms, each having a portion adapted to engage a package, pivotally connected to said carriage in such manner that one of said arms independently pivots towards one of said banks upon counterclockwise rotation of said lever and the other of said arms independently pivots towards the other of said banks upon clockwise rotation of said lever;

means for moving said carriage along said frame;

means for rotating said lever in either a clockwise or counterclockwise direction;

means coupled to said carriage for producing a signal indicative of the position of said carriage with respect to said predetermined positions;

means coupled to said lever for producing a signal indicative of the direction and degree to which the lever has rotated; and control means responsive to both said signals for causing said carriage to assume a selected one of said plurality of predetermined positions and for limiting the rotation of said lever to a predetermined degree in either direction of rotation.

10. An apparatus according to claim 9 further including:

means coupled to said carriage and to said control means for producing a signal indicative of the presence or absence of an article within any selected one of said plurality of package storage compartments.

11. An apparatus according to claim 9 wherein said means for moving said carriage includes a first motor which is affixed to said frame and drives an elongated screw threadably engaging said carriage, and wherein said means for rotating said lever includes a second motor which is affixed to said frame and drives an elongated bar engaging said lever.

* * * * *